Oct. 12, 1943.   J. C. HODGE   2,331,689
WELDING METHOD AND APPARATUS
Filed April 29, 1941
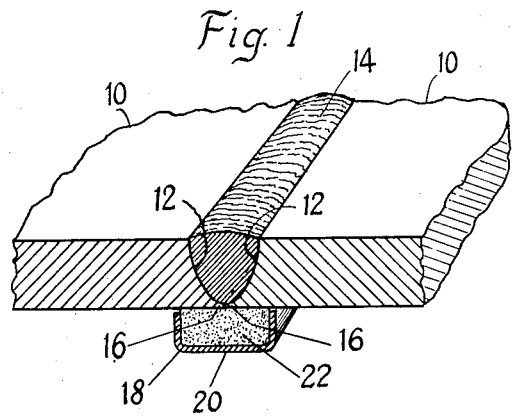
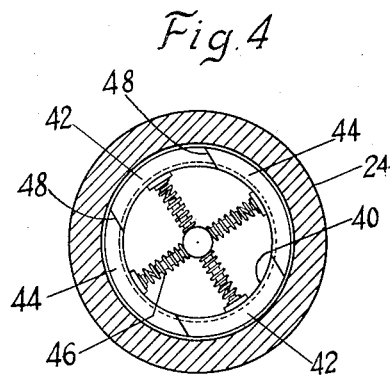
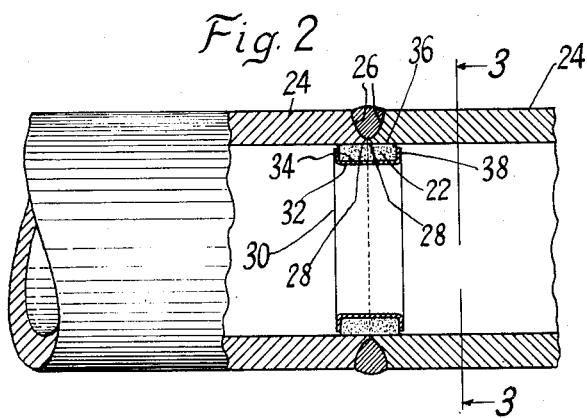
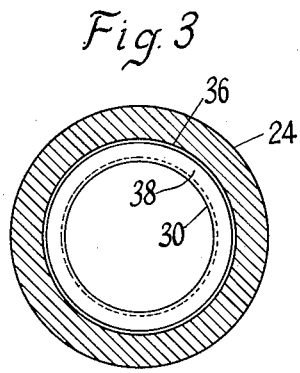
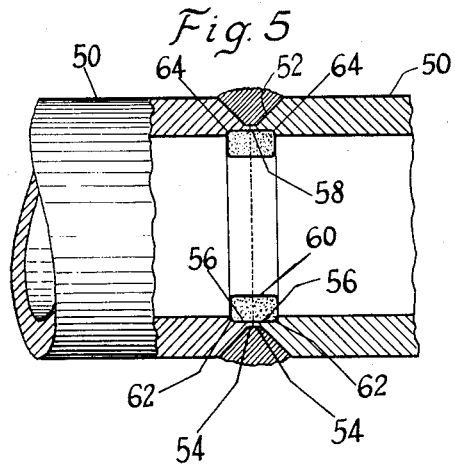
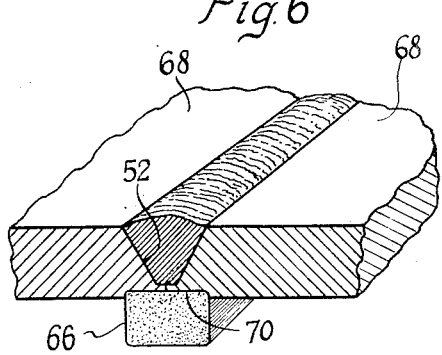
INVENTOR.
James C. Hodge
BY
Joseph R. Moran
Attorney Patented Oct. 12, 1943

2,331,689

UNITED STATES PATENT OFFICE 2,331,689

WELDING METHOD AND APPARATUS

James C. Hodge, Akron, Ohio, assignor to The Babcock & Wilcox Company, Newark, N. J., a corporation of New Jersey Application April 29, 1941, Serial No. 390,873

9 Claims. (Cl. 113—112)

The invention herein disclosed pertains to methods and apparatus for welding joints between metallic bodies particularly where such joints are formed between the contiguous ends of plates or tubular members. In practice when a weld is made throughout the full thickness of the stock, there is usually an excess of fused weld metal remaining at the joint which requires removal in order to restore the original uniform thickness and surface alignment. In cases where the edges of the stock have been spaced to provide a welding groove to receive fusion-deposited weld metal, the base of the groove has been bridged by a backing member to dam the flow of molten metal outwardly of the seam, but while such members may have served the purpose of restricting the flow of molten metal to the exterior of the seam, there has been the disadvantage that the member would become welded in place and thus require additional labor for its removal, or would cause imperfections in the welded joint, due to the materials heretofore selected for the backing member.

It is an object of the subject invention to prevent the projection of excess metal exteriorly of the weld by effectively arresting the flow of molten weld metal substantially at the surfaces of metallic plates or tubular bodies whose contiguous edge portions are being welded together.

A further object of the invention is to provide a backing material which will enable the weld metal to be deposited without contamination.

Other objects of the invention relate to the formation of the metallic bodies adjacent their welding ends, and to the formation and composition of the backing element to facilitate the welding operation; to minimize incorporation of backing material into the metal of the weld; and to facilitate removal of any adhering backing material after the weld has been completed.

The various objects and features are further disclosed by the description which follows and by the accompanying drawing in which:

Fig. 1 is a fragmentary view illustrating means whereby the invention may be practiced;

Fig. 2 illustrates a modified arrangement involving tubular bodies;

Fig. 3 is a sectional view taken along line 3—3 of Fig. 2;

Fig. 4 is a sectional view showing a modification;

Figs. 5 and 6 represent further modifications.

Referring to the drawing in detail, in Fig. 1 the plates 10 to be welded have their edges 12 so formed that when the edges are placed in contiguous relation as shown a generally U-shaped groove is formed between the plates for the reception of fusion-deposited weld metal 14 by which the plates 10 are made integral. The base of the groove may be formed by projections 16 on the plates, which projections may be arranged substantially in contact as shown, although for certain conditions a narrow gap may be preferred. A backing element 18 is provided across the seam or groove adjacent the underside of the plates to inhibit the flow of molten metal from the groove and if desired to also provide a support for the welding edges to hold them in alignment during the welding operation. The backing element 18 may include a channel member 20, preferably metallic, having its open side facing the underside of plates 10 and containing a material 22 preferably of an incombustible character and in a compacted mass for arresting the flow of molten metal from the seam substantially at the plate surface. In Fig. 1 and in subsequent figures, the welding groove is represented as being filled with weld metal whereas adjoining parts are shown in the form prior to welding. For convenience and simplicity of illustration, there has been no attempt to indicate the manner in which such parts may become modified by fusion, nor the extent to which the weld metal may penetrate the backing material.

The backing material 22 may consist of one or more ingredients but preferably contains as an essential constituent fine metallic particles of substantially the same chemical analysis as the predominant metallic constituent of the weld metal. When plates or other articles of iron or steel are to be welded, and the weld metal is composed chiefly of iron or steel, the channel 20 may be tightly packed with iron powder of a fineness of about 100 mesh such as is produced by electrolytic processes. If desired the channel 20 may be filled with a heat-resistant moldable compound which incorporates iron powder with some suitable binder and which when set, either because of inherent air-set properties or as a result of heat treatment, provides the density of backing required to prevent any substantial penetration by the molten weld metal. Thus there is complete welding throughout the full depth of the seam with minimum penetration of weld metal beyond the seam. If the weld metal combines two or more metals as in the case of an alloy, the backing element will preferably contain a similar combination of metals as the predominant metallic content. For example, in welding together certain alloy steel parts wherein the weld metal is an alloy steel containing chromium and nickel in percentages 18 and 8 respectively, the backing material 22 may suitably comprise particles of a similar ferrous alloy containing chromium and nickel in substantially the same proportion. The material which may be picked up by the weld metal is therefore essentially metallic, and of a corresponding analysis, so that the possibility of causing contamination of the weld is practically eliminated. Moreover, the excess backing material which may adhere to the joint after welding is completed is of such character and quantity as to enable it to be readily removed by brushing.

Figs. 2 and 3 show an application of the invention to tubular sections 24 having their ends 26 shaped similarly to the edges 12 of plates 10 to provide a correspondingly U-shaped welding groove when the ends 26 are placed in contiguous relation as shown, with projections 28 in contact or slightly spaced as desired. The backing element 30 comprises a ring 32 preferably of metal and of such cross section as to provide a peripheral channel or pocket 34 for retaining a suitable backing material 22 such as hereinbefore described. For a circumferential joint as shown, it may be found more convenient to employ a material 22 of moldable character which may be packed into the channel 34 while moist, and which after drying or setting becomes a bonded mass of metallic particles. The outer diameter 36 of the annulus of material 22 is substantially equal to the inside diameter of the tube ends 26 to provide a close sliding fit therewith while the outer diameter of the channel sides 38 is somewhat less to provide a clearance for ready removal after welding.

According to Fig. 4 the ring 40 corresponding to ring 32 may be formed of a plurality of sections, preferably three or more such as 42 and 44, each supporting a section of the backing material 22 which may be forced outwardly against the inside wall of the tube sections 24 by a suitable arrangement of springs 46. The interfitting surfaces 48 of certain adjacent ring sections 42 and 44 are preferably parallel to facilitate assembly within the tube sections and to afford a means for collapsing the ring for the purpose of removal.

In Fig. 5 a modification is shown wherein tube sections 50 are shaped at their ends to form a V-shaped welding groove 52 substantially closed at its base by projections or lips 54, the included angle of the groove being approximately 90°. The inner wall of each tube section may be counterbored as at 56 to provide a shallow annular recess 58 for a backing ring 60 when the tube sections are brought into alignment; the inside corners of the recess being filleted as at 62. The backing ring 60 is conveniently inserted within the counterbore 56 of one tube section whereupon the other tube section is telescoped over the extending end of the ring which fits into the counterbore 56 of the other tube section, the side walls 64 of the ring recess 58 maintaining the backing ring in centralized relation to the welding groove 52. The width of the ring 60 may be equal to the combined longitudinal dimensions of the counterbores 56 to permit the projections 54 to abut as illustrated, or the width may be greater to provide a separation between the projections 54, as desired. The counterbores 56 may be omitted, but with less convenience, in which case some other means would be necessary to correctly position the backing ring relative to the welding seam.

The backing ring 60 is preferably preformed as a continuous ring prior to assembly within the tube sections and, as for previously described embodiments, is formed chiefly of metallic particles of an analysis corresponding to the weld metal with which it is to be used. The metallic content of the ring may include metal particles of different degrees of fineness mixed with a binder material of inorganic character to form a plastic mass which may be molded to slightly oversize dimensions and then heat treated. In general, organic binders are to be avoided due to their low decomposition temperatures.

For welding together tube sections or other parts of low or medium carbon steels, or of alloy steels in which the percentage of the alloying metal or metals other than iron does not exceed approximately 5%, the composition of the backing element 60 may be about as follows:

| | Per cent |
|---|---|
| Iron chips, 0.18% carbon (−28+48 mesh) | 30 |
| Iron powder, electrolytic (−100 mesh) | 60 |
| Binder as described | 10 |

The proportions specified in the foregoing table are to be understood to be nominal percentage values and subject to variations of from at least 5–10%. The binder may suitably comprise a mixture of raw kaolin with hard burned kaolin particles of a fineness preferably no less than that specified for the iron chips. The metallic ingredients and binder are thoroughly mixed to provide complete and uniform distribution of the coarse and fine metallic particles throughout the mass, and a minimum amount of water added if necessary after mixing to render the mixture sufficiently plastic for molding purposes. The molded ring may be then subjected to a short drying or setting treatment at about 212° F., followed by a 15 to 30 minute baking treatment at about 1600° F. After cooling, the ring is preferably surface finished to provide the desired fit within the tube recess 58. The resultant ring is rigid and of sufficient strength to withstand handling during assembly within the tube sections, and to resist fracture during the welding process; however, the chosen composition and treatment are such as to render the ring friable so that it may be readily broken or crushed for convenience in removing the same from the tube after welding.

As an alternative to such procedure, the backing element may be preformed without the use of binder material, by a light sintering process sufficient to cause the metallic particles to become coherent, at least at the surface of the mass, and thus provide a self-supporting yet friable structure.

The ring should fit snugly against the circumferential wall of the recess to retard the action of the arc by uniformly distributing the heating effect over the entire contact area to eliminate localized hot spots, thus reducing the extent to which the molten weld metal penetrates the backing ring, and minimizing the amount of slag constituents in the backing ring which may be picked up by the weld metal. With this process it is found that solidification of the weld metal occurs approximately immediately after penetration begins.

As above indicated, the preferred composition of backing ring includes a greater proportion by weight of fine metallic particles as compared with the proportion of coarser particles. These proportions have been reversed, that is, a greater proportion of coarse particles than of fine particles, but the results were not as satisfactory due to the substantially greater penetration of the weld metal into the backing ring, and a consequent greater pickup of slag material into the weld. A certain proportion of coarse metallic particles is desirable since the strength of the ring is considerably increased thereby, whereas a ring composed of metallic powder particles and a binder material, without coarser metallic particles, is relatively weak and unsatisfactory.

A backing element such as described is especially adapted for use in a metallic arc welding process wherein the base metal is preferably preheated to about 150° F. or more to relieve the initial chilling of the first bead or layer of weld metal deposited, thereby promoting greater uniformity of penetration and improving the quality of the weld. For a tube of 4 inches outside diameter and having a wall thickness of ½ inch, each projection 54 is about 3/64" thick and extends longitudinally about 3/32"; the backing ring 60 being about ½" wide and having a radial thickness of about 3/8". The depth of the annular recess 58 is approximately 1/16". In applying the first bead, an electrode of 3/32" nominal diameter, operating in the vertical position, is supplied with a welding current of about 120 amperes D. C. at 55 volts, the arc being held at the juncture of the annular extensions 54 and the electrode fed relatively slowly toward the work. The reference to D. C. current in the foregoing example is not to be taken as a limitation since either A. C. or D. C. current may be utilized. Larger sizes of tubing or pipe, involving greater wall thicknesses, require corresponding changes in the dimensions at the tube ends and in the size of backing ring and weldrod to be used, and a determination of suitable voltage and amperage values.

After welding is completed, with weld metal filling the groove 52 about as indicated, the small amount of backing ring material which may adhere to the weld metal is readily removed by a wire brush, leaving a clean interior wall surface with a negligible amount of weld metal projecting inwardly from the welded joint a distance ordinarily less than the depth of the shallow annular recess 58. The excess weld metal may be removed if desired, as by chipping, but the amount of labor involved, and therefore the expense, would be appreciably less than that required to remove the customary solid metal backing plate.

Fig. 6 illustrates a molded backing element 66 in strip form, for use with flat plates 68, or in conjunction with a longitudinal seam in a tubular member. In other respects, this embodiment corresponds to Fig. 5, including for example the formation of the contiguous plate ends which provide the V-shaped welding groove 52, and the cross-sectional formation and composition of the backing strip 66 which is received within the longitudinal recess 70.

The invention as herein disclosed in accordance with the provisions of the statutes will be understood by persons skilled in the art to be applicable in arrangements other than those specifically described, and to include features which may be used to advantage without a corresponding use of other features, within the scope of the appended claims.

I claim:

1. In a process of joining metallic components of tubular form wherein end portions of said components are arranged in contiguous relation to form a circumferential welding seam and wherein weld metal is deposited by fusion in and along said seam from the exterior of said components to form a welded joint, the steps which comprise, forming said components at their contiguously arranged ends to provide an annular groove bridging said seam, and filling said groove with a material comprising metallic particles bonded together in a compact friable mass to inhibit the flow of weld metal from said seam, said material extending from the surface of said components at the bottom of said groove for a distance sufficient in relation to the heat used in the welding operation to insure only partial penetration of molten welding metal from said seam into said mass.

2. In a process for joining metallic components by fusion welding wherein portions of said components are arranged in contiguous relation to provide a seam to be welded, bridging said seam at one side with a backing medium comprising metal in finely divided condition, and depositing weld metal by fusion in and along said seam from the other side thereof to form the welded joint, said finely divided metal constituting substantially the entire mass of said medium and being so assembled and supported as to provide a predominantly metallic friable backing for said seam of lower thermal conductivity than solid metal of the same composition, said backing including metal particles adjacent said seam adapted to be fused by the heat of welding for coalescence with weld metal at the root of the weld without impairment of its quality, while other more remote particles remain substantially unaffected to facilitate removal of the remaining portion of the backing from its position adjacent the welded seam.

3. The method of backing up a seam to be welded, wherein weld metal is deposited by fusion in and along said seam from one side to join metallic components, which comprises, forming a pocket embracing said seam at its opposite side, and filling said pocket with a backing medium comprising metal particles so assembled and supported within said pocket as to provide a predominantly metallic backing of friable character, the relationship of metal particles within said pocket providing limited thermal conductivity throughout said backing lower than for a solid metal backing having the composition of said metal particles, whereby fusion of metal particles by the welding heat is limited substantially to that portion of the backing adjacent said seam while other metal particles remain unfused to maintain a more remote portion of said backing friable to facilitate its removal from adjacent the welded seam.

4. In a process for joining metallic components by fusion welding wherein portions of said components are arranged in contiguous relation to provide a seam to be welded, bridging said seam at one side with a friable mass comprising metal particles, and depositing weld metal by fusion in and along said seam from the other side thereof to form the welded joint, said particles being of substantially the same composition as the fusion deposited metal and constituting the major portion of said mass to provide a predominantly metallic backing for said seam, said backing including metal particles adapted to be fused by the welding heat for coalescence with weld metal at the root of the weld without impairment of its quality, while other metal particles in a remaining portion of said backing remain unfused to maintain said last named portion friable to facilitate subsequent removal from adjacent the welded seam.

5. In a process for joining metallic components by fusion welding wherein portions of said components are arranged in contiguous relation to provide a seam to be welded, bridging said seam at one side with a backing medium comprising metal particles suitably bonded together to form a compact friable mass, the metal content of said mass predominating and providing metal particles in a portion of said medium adjacent said seam adapted to be fused by the welding heat for incorporation in the welded joint without impairment of its quality while other metal particles in a portion more remote from said seam remain unfused to maintain said last named portion relatively friable and readily separable from the welded joint.

6. A backing-up element for a seam to be welded having at least a portion thereof friable and comprising a mass of comminuted metal of which the metal particles collectively provide a backing medium of limited heat conductivity substantially lower than solid metal of similar composition.

7. A backing-up element for a seam to be welded comprising a relatively dense mixture comprising metal particles suitably bonded to form a compact friable mass, the metal content of said mass predominating and combining relatively fine particles with coarser particles in a ratio of approximately 2:1 by weight.

8. A backing-up means for a seam to be welded comprising a mass of iron particles substantially in the form of powder, and means for holding said particles in massed relationship in contact with the work adjacent said seam to provide a friable backing medium predominantly metallic and of relatively low thermal conductivity throughout as compared with solid metal having the composition of said metal particles, thereby enabling metal particles adjacent said seam to be fused with the joint metal without impairment of its quality while limiting penetration of weld metal into the remaining friable portion of said mass.

9. A backing-up medium for a seam to be welded comprising metal in finely divided form, and bonding means for supporting said metal in a compact mass for application to the work while maintaining the structure of said medium relatively friable, said finely divided metal constituting the major constituent of said medium and providing a medium of low thermal conductivity as compared with solid metal of similar composition, whereby penetration of weld metal into said medium is arrested substantially adjacent the surface nearest the work, and the unpenetrated portion enabled to remain substantially in its original friable state to facilitate subsequent removal from the welded joint.

JAMES C. HODGE.